UNITED STATES PATENT OFFICE 2,582,885

METHOD OF REMOVING FREE OXYGEN OR FREE HYDROGEN FROM A GASEOUS MEDIUM

Edgar F. Rosenblatt, East Orange, N. J., assignor to Baker & Co., Inc., Newark, N. J., a corporation of New Jersey No Drawing. Application August 23, 1948, Serial No. 45,780

4 Claims. (Cl. 23—2)

This invention deals with a process or method of removing oxygen and hydrogen, or either of them, from gases containing free oxygen or hydrogen.

Many industrial processes require gases or gaseous mixtures which are substantially free from oxygen or hydrogen or both or which contain a controlled amount thereof. Thus there is, for instance, an important industrial demand for hydrogen or other gases, e. g. inert gases such as argon, neon, helium, nitrogen, methane, ethane, carbon dioxide, and others, in which the oxygen content is below a critical amount which may be as small as a few thousandths of 1%, e. g. a maximum of $\frac{1}{1000}$ of 1%. Commercial gases, however, usually contain some admixture of oxygen as an impurity, frequently 0.5% or more, and the elimination of such impurity is of the greatest industrial importance. For example, the nitrogen-hydrogen mixture of the ammonia synthesis, the nitrogen or rare gases used in the lamp and radio industries, the nitrogen or other gas filling of high power electrical cables, inert gases for the processing of metals, e. g. sintering, brazing, annealing, etc., should be free from oxygen or contain no more than mere traces of oxygen in order to assure satisfactory results. In other cases, a substantially pure gas may become contaminated with oxygen during its utilization and such contamination may be undesirable. Also there are many processes involving the isolation of a particular gas from a gaseous mixture thereof with oxygen or hydrogen or both, as for instance the manufacture of nitrogen from the air. Likewise, there is a substantial industrial demand for hydrogen which is free from oxygen beyond the minimum tolerances of customary electrolytic hydrogen.

The classical method of purifying hydrogen from oxygen is that of contacting the impure hydrogen with copper or copper compounds heated to a temperature of over 600° C. It has also been known to combine hydrogen and oxygen by means of precious metal catalysts, such as silver or a member of the platinum group, but such precious metal catalyst normally required elevated temperatures usually in excess of 200° C., for the occurrence of the reaction, or the speed of the reaction was otherwise too slow to assure substantially complete elimination of the oxygen or hydrogen, respectively.

It is, therefore, one object of this invention to provide a method or process of removing oxygen or hydrogen from gases in a highly efficient manner down to the most minute traces. It is a further object to provide such method or process based on the employment of a precious metal catalyst.

This application is a continuation-in-part of my earlier application, Serial Number 634,150, filed December 10, 1945, now abandoned.

The present invention involves the provision of a specific catalyst for the reaction, $O_2 + 2H_2 \rightarrow 2H_2O$ (gas) $+114.24$ kilo calories, having such characteristics in this specific reaction as to make possible the practical application thereof to the commercial removal of oxygen, or hydrogen, from gases.

I have found that the catalytic combination of oxygen and hydrogen may be carried out most effectively in the presence of a catalyst of palladium deposited on a support taken from the group consisting of aluminum oxide and zirconium dioxide, as more particularly described hereafter. I have found that such catalyst is distinguished from other catalysts for the oxidation of hydrogen, as previous known, by its high efficiency at low temperatures, such as room temperatures, i. e. normal atmospheric temperature. The reaction in the presence of such catalyst is, therefore, characterized not only by its occurrence at room temperatures but also by its extremely high efficiency, i. e. ability to speedily combine oxygen and hydrogen down to the smallest quantities of the reactants. The reaction is further characterized by the advantage that the catalytic activity of the catalyst is unimpaired by occasional or prolonged exposure to high temperatures, so that the catalyst is operating efficiently at low as well as high temperatures occurring either intentionally or as the result of the combustion of the hydrogen. It is especially noteworthy that the combination of the hydrogen and the oxygen in the presence of th catalyst of the invention is accomplished extremely fast, thus requiring very short contact time between the gases and the catalyst.

All processes requiring the elimination of oxygen or hydrogen or both from a gaseous mixture can be carried out by means of the catalytic combination of oxygen and hydrogen.

Thus the purification of gases from oxygen may be accomplished for instance by combining the oxygen catalytically with hydrogen which may be contained in the gas either as an initial constituent thereof, e. g. where the gas to be purified from oxygen consist of hydrogen, or as an additive element intentionally admixed with the gas for the specific purpose of combining it catalytically with such oxygen and thereby eliminating the latter. Similarly, the manufacture of nitrogen from the air may be accomplished by catalytically combining the oxygen of the air with hydrogen intentionally admixed therewith, leaving nitrogen as the sole substantial residual element.

The reaction being strongly exothermic, the temperature increment occurring on reduction of the oxygen may also be used as a step in the determination of the oxygen content of a gas containing oxygen, since the efficiency of the catalytic combination is such that substantially the entire amount of oxygen present in a gaseous mixture is removed thereby, so that such temperature increment is in fact indicative of the amount of oxygen previously present in the gas. Conversely, the absence of a temperature increment is indicative of the absence of oxygen.

The catalyst employed in the reaction forming part of the process or method of the invention consists of the catalytic metal palladium, with or without admixture of other catalyst metals, deposited on a support of aluminum oxide or zirconium dioxide in dehydrated state, such as for example ignited activated alumina.

The catalyst metal, palladium, deposited on the support may be present in any desirable quantity; I have found, for instance, that even as little as 0.01% palladium by weight will give satisfactory results. While there is no specific upper limit for the amount of palladium contained on the surface of the support, it will not be useful normally to employ more than 1% palladium by weight, although larger amounts may be used if desired. More specifically, I employ and recommend a catalyst containing from 0.1% to 0.5% palladium by weight, distributed uniformly over the surface of the aluminum oxide or zirconium dioxide support. The catalyst may also contain other metals or compounds, catalytic or non-catalytic, such for example as other metals of the platinum group, in addition to the palladium.

The support of dehydrated alumina—such as activated alumina or anhydrous aluminum oxide—or dehydrated zirconium dioxide may be in any suitable shape or form, such for example as granular form, tablets, pellets or the like.

The deposition of the palladium on the surface of the carrier material may be carried out in any useful manner. One particular effective method of accomplishing the desired surface deposition is by way of hydrolysis of a dissolved 2-valent palladium compound, e. g. the sodium salt of tetrachloropalladic acid—$Na_2PdCl_4$, in contact with the basic dehydrated alumina or zirconia, and reduction of the resultant precipitate of palladium oxide or hydroxide. Preferably the solution of such palladium salt has during the hydrolysis and the reduction, but at least during the reduction, a pH value of from 5 to 12. Such especially suited method, to which the production of the catalyst used in the present invention is not, however, limited, is more particularly described in my co-pending application, Serial Number 637,483, filed December 27, 1945 and which has issued as Patent No. 2,475,155, July 5, 1949.

The high efficiency of the catalyst involved in the method of the invention in combining even the smallest traces of oxygen with hydrogen has been demonstrated in actual tests and by actual plant experience. Thus, for instance, ordinary commercial tank hydrogen containing about 0.1% oxygen was passed at room temperature through a catalyst chamber containing a palladium alumina catalyst and then into a chamber containing silica gel with adsorbed phosphorescent dye, in accordance with a method of testing described in the Journal of Chemical Physics, vol. 12, No. 7, pages 295-299, with the result that the phosphorescence was quenched to 27% of the normal intensity, indicating that the oxygen content of the gas after the reduction of the original oxygen content was of the order of one part in ten million parts.

The reaction whereby oxygen and hydrogen are combined in the presence of a precious metal catalyst is known per se. It is, of course, also known that palladium is a catalyst adapted to promote such reaction.

In the present invention, such reaction is utilized to bring about a commercial result, the elimination of oxygen or hydrogen from a gas, for instance, for the purpose of producing such gas in purified state, which is practicable only when carried out in the presence of a catalyst of far greater efficiency, at a useful low temperature such as room temperature, than any platinum or palladium catalyst heretofore known to be used for this reaction.

The high efficiency displayed by the catalyst of palladium and dehydrated alumina or zirconia in the reaction of combining oxygen and hydrogen, in the free gaseous state, is due to a specific catalytic effect in this reaction dependent on the combination palladium and dehydrated alumina or zirconium dioxide. Such efficiency is not displayed in this reaction by other catalysts of palladium or by catalysts of other precious metals, notwithstanding the generally high efficiency of such catalysts in other catalytic reactions.

The difference between the catalysts here involved and other catalysts for the catalytic combination of oxygen and hydrogen, and the superiority of the present catalysts over other previous metal catalysts, can be illustrated by the efficiency characteristics of such catalysts. In testing various catalysts, I employed purified and dried hydrogen to which a measured quantity of oxygen had been added, the oxygen being generated electrolytically with 900 ma. current. The thus impure hydrogen gas was passed through catalyst cells consisting of glass tubing, 12 mm. wide, containing the catalysts; the cells being placed in a water bath maintained at a temperature range of 25° C. to 27° C. The flow rate of the hydrogen was varied in the tests between 30 and 120 liters per hour, while the oxygen generation was kept constant. On emerging from the catalyst cell, the oxygen remaining in the hydrogen was measured. The following tables illustrate the efficiency of various catalysts in accordance with the invention in the catalytic combination of hydrogen and oxygen. Table I gives the results of a number of tests carried out with a catalyst of 0.5% palladium on a carrier of dehydrated activated alumina in the form of $\frac{5}{32}''$ pellets; 5 palladized pellets, approximately 360 mg., were employed. Table II gives the results of a similar test in which the catalyst was identical with that of the experiments of Table I except that the catalyst metal, 0.5% by weight, consisted of palladium and platinum in equal amounts. The term "efficiency" in the tables refers to the logarithm of the purification (P) which a given amount of catalyst will produce at standard flow rate at room temperature. The purification is defined as the ratio of the oxygen concentration in the gas before and after exposure to the catalyst. The purification (F) at any other flow rate (M) is calculated as $$F = \frac{1}{P_M}$$

whence $M \times \log F = \log P$. The efficiency (log P) is found experimentally by measuring F at known flow rates.

Table I

| Experiments | Flow Rate lt/hr. (M) | Purification Factor (F) | M × Log F |
|---|---|---|---|
| 1 | 49.3 | 5.73 | 43.0 |
|   | 72.5 | 4.68 | 48.5 |
|   | 92.3 | 3.48 | 50.0 |
|   | 120.0 | 2.93 | 56.0 |
| 2 | 32.7 | 21.00 | 46.5 |
|   | 47.8 | 9.95 | 47.5 |
|   | 67.5 | 5.24 | 48.5 |
|   | 89.5 | 3.93 | 53.0 |
|   | 120.0 | 2.92 | 55.5 |

Average $M \times \log F = 50$, corresponding to an efficiency of 139 per gram catalyst and an efficiency of 278 per 10 mg. palladium.

Table II

| Experiments | Flow Rate lt/hr. (M) | Purification Factor (F) | M × Log F |
|---|---|---|---|
| 1 | 38.9 | 9.90 | 39.0 |
|   | 50.0 | 6.20 | 40.0 |
|   | 67.8 | 4.27 | 42.5 |
|   | 90.7 | 3.02 | 43.5 |
|   | 122.0 | 2.44 | 47.0 |
| 2 | 33.3 | 13.85 | 38.0 |
|   | 48.6 | 7.65 | 43.0 |
|   | 71.0 | 4.80 | 48.5 |
|   | 95.0 | 3.42 | 50.5 |
|   | 120.0 | 2.93 | 56.0 |

Average $M \times \log F = 45$, corresponding to an efficiency of 125 per gram catalyst and an efficiency of 250 per 10 mg. palladium and platinum.

The experiments show that the efficiency per 10 mg. catalyst metal was 278 in the case of 0.5% palladium on alumina catalysts (Table I) and 250 in the case of 0.25% palladium—0.25% platinum on alumina catalyst. In order to evaluate this high efficiency by comparison with the efficiency of other catalysts, it might be noted that in tests measuring other catalysts the efficiency of a catalyst of 0.5% platinum on dehydrated alumina was 127 and that even in the case of other palladium catalysts substantially lower efficiencies were determined as optimum efficiencies, e. g. 54 in the case of 0.5% palladium on activated carbon.

The combination of oxygen and hydrogen is accompanied by the development of heat, the temperature increment being about 160° C. for the reduction of 1% oxygen in a stream of hydrogen.

Where, therefore, the total amount of oxygen in the gas is less than that capable of producing a total prevailing temperature of 500° C., it is possible to reduce the entire amount of oxygen in one step, although for reasons of safety it is advantageous to remain substantially below such maximum temperature. In cases where the amount of oxygen present in the gas is more than approximately 2%–3%, it is desirable to carry out the reduction of the oxygen in a step by step process involving the reduction of not more than 2% to 3% oxygen at one time and thus passing the gaseous mixture involved through a number of catalyst cells or chambers, or cycling it repeatedly through the same catalyst cell or chamber, in either case preferably with intermediate cooling, and consequent gradual elimination of the oxygen content. Such step by step reduction can be carried out by controlling the amount of hydrogen and limiting it to a maximum of not more than twice the amount of oxygen to be reduced, i. e. a maximum of 6% hydrogen corresponding to a maximum amount of 3% oxygen to be reduced. Such step by step process would be desirable for instance where the method of the invention is employed in the removal of oxygen from air. Removal of oxygen from air may be desired for various purposes such for instance as the manufacture of nitrogen, as a residual element of the air mixture, for the synthesis of ammonia or for the production of an inert atmosphere, or for the maintenance or control of an inert atmosphere, e. g. for the protection of enclosed objects subject to destruction or deterioration in the presence of oxygen, such as food products, machinery or the like.

The catalytic reaction is, of course, accompanied by the formation of water which may be removed from the gas, if desired or required, by the utilization of adsorbent materials such as activated alumina, silica gel, or the like, or by desiccators such as phosphorous pentoxide, calcium chloride, magnesium perchlorate, or the like, or by condensation through cooling. The combustion of the hydrogen is in all cases flameless, i. e. the employment of the reaction involved is truly catalytic and ignition is avoided in all cases.

What I claim is:

1. The method of removing free oxygen or free hydrogen from a gaseous medium, comprising passing a gaseous medium containing free oxygen and free hydrogen over a catalyst of palladium deposited on a dehydrated oxide taken from the group consisting of aluminum oxide and zirconium dioxide and combining the said oxygen and hydrogen at normal atmospheric temperature, continuing the combination of said oxygen and hydrogen over said catalyst in a flameless combustion until at least one of said gases oxygen and hydrogen is substantially eliminated.

2. The method of removing free oxygen from a gaseous medium, comprising passing said gaseous medium containing hydrogen in an amount at least double the oxygen content thereof over a catalyst of palladium deposited on a dehydrated oxide taken from the group consisting of aluminum oxide and zirconium dioxide and combining the said oxygen and hydrogen at normal atmospheric temperature, continuing the combination of said oxygen and hydrogen over said catalyst in a flameless combustion until said oxygen is substantially eliminated.

3. The method of removing free oxygen from a gaseous medium, comprising passing said gaseous medium containing said oxygen and containing hydrogen in an amount not in excess of about 6% by volume over a catalyst of palladium deposited on dehydrated activated alumina and combining the said oxygen and hydrogen at normal atmospheric temperature, continuing the combination of said oxygen and hydrogen over said catalyst in a flameless combustion until said oxygen is substantially eliminated.

4. In the extraction of nitrogen from gaseous air, the step of eliminating oxygen from said air, comprising admixing hydrogen repeatedly to said air in an amount not in excess of about 6% by volume and passing said mixture over a catalyst of palladium deposited on a support taken from the group consisting of dehydrated aluminum oxide and zirconium dioxide and combining the said oxygen and hydrogen at normal atmospheric temperature, continuing the combination of said oxygen and hydrogen in a flameles combustion until at least said oxygen is substantially eliminated.

EDGAR F. ROSENBLATT.

REFERENCES CITED

The following references are of record in the file of this patent:

UNITED STATES PATENTS

| Number | Name | Date |
|---|---|---|
| 548,909 | Duke | Oct. 29, 1895 |
| 1,111,502 | Schwarcman | Sept. 22, 1914 |
| 1,770,059 | Barber | July 8, 1930 |
| 2,207,868 | Martin | July 16, 1940 |
| 2,272,711 | Hull | Feb. 10, 1942 |

OTHER REFERENCES

Mellor: "Inorganic and Theoretical Chemistry," vol. 1, page 487 (1922), Longmans, Green & Co., N. Y., publishers.

Cohn: Article in "Industrial and Engineering Chemistry," Anal, Ed., vol. 19, November 1947.